United States Patent
Tsirkin

(10) Patent No.: US 9,323,706 B2
(45) Date of Patent: Apr. 26, 2016

(54) CONFIGURATION SNOOPING BRIDGE

(71) Applicant: Red Hat Israel, Ltd., Raanana (IL)

(72) Inventor: Michael Tsirkin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 291 days.

(21) Appl. No.: 13/777,462

(22) Filed: Feb. 26, 2013

(65) Prior Publication Data

US 2014/0244885 A1 Aug. 28, 2014

(51) Int. Cl.
*G06F 13/00* (2006.01)
*G06F 13/40* (2006.01)

(52) U.S. Cl.
CPC .................. *G06F 13/4027* (2013.01)

(58) Field of Classification Search
CPC .............. G06F 9/4401; G06F 9/4411–9/4415; G06F 13/10; G06F 13/124–13/126; G06F 13/14; G06F 13/20; G06F 13/22; G06F 13/40; G06F 13/4004; G06F 13/4027
See application file for complete search history.

(56) References Cited

U.S. PATENT DOCUMENTS

| | | | | |
|---|---|---|---|---|
| 5,838,932 A * | 11/1998 | Alzien | ........................ | 710/314 |
| 6,189,063 B1 * | 2/2001 | Rekeita et al. | ................ | 710/311 |
| 6,629,157 B1 * | 9/2003 | Falardeau et al. | .............. | 710/10 |
| 6,823,418 B2 * | 11/2004 | Langendorf et al. | ......... | 710/306 |
| 7,110,413 B2 * | 9/2006 | Riley | ........................... | 370/401 |
| 7,117,289 B2 * | 10/2006 | George | ........................ | 710/314 |
| 7,689,755 B2 * | 3/2010 | Balasubramanian et al. | | 710/311 |
| 7,743,189 B2 * | 6/2010 | Brown et al. | ................. | 710/104 |
| 8,539,134 B2 * | 9/2013 | Bacher et al. | ................ | 710/313 |
| 8,583,848 B2 * | 11/2013 | Miyoshi | ........................ | 710/313 |
| 8,595,405 B2 * | 11/2013 | Matthews | ............ | G06F 9/4411 710/306 |
| 8,650,349 B2 * | 2/2014 | Nordstrom et al. | .......... | 710/306 |
| 2003/0005207 A1 * | 1/2003 | Langendorf et al. | .......... | 710/306 |
| 2004/0064602 A1 * | 4/2004 | George | ........................ | 710/22 |
| 2004/0250063 A1 * | 12/2004 | Gulick et al. | ................ | 713/160 |
| 2008/0222338 A1 * | 9/2008 | Balasubramanian et al. | | 710/306 |
| 2011/0202703 A1 * | 8/2011 | Bacher et al. | ................ | 710/313 |
| 2011/0296074 A1 * | 12/2011 | Nordstrom et al. | .......... | 710/312 |
| 2012/0036306 A1 * | 2/2012 | Miyoshi | ....................... | 710/316 |

* cited by examiner

*Primary Examiner* — Paul R Myers
(74) *Attorney, Agent, or Firm* — Lowenstein Sandler LLP

(57) ABSTRACT

Systems and methods for configuration snooping are provided. A bridge identifies an initialization message of a central processing unit (CPU) for a device that is downstream of a primary interface of the bridge. The bridge identifies a response to the initialization message. The bridge determines the address range for the device. The bridge stores the address range for the device in a list in the bridge.

20 Claims, 5 Drawing Sheets

CONFIGURATION SNOOPING BRIDGE

TECHNICAL FIELD

Embodiments of the present disclosure relate to a computing system, and more specifically, to a bridge for snooping device configuration.

BACKGROUND

Computing systems can use a bus as a connection or communication path between computer components. A system bus or local bus, for example, can connect a processor to system memory. Typically, buses support a limited number of devices. Hence, in order to increase the number of available devices, many computing systems have multiple buses. Buses can be connected via bridges that provide a connection path between two independent buses. Bridges can allow operations or transactions to flow between buses connected to the bridge.

When a computing system is initialized, it can identify a connected bus and assign it an identifier (e.g., a bus number). The computing system can then send a probe for available devices to any connected buses. Each available device can respond to the probe by informing the computing system it is available to receive an address. The computing system can then assign addresses to the detected devices in an address assignment operation. The probe, the response to the probe, and the address assignment operation can be part of an initialization transaction for a device. The computing system can also detect when a new device is connected to the computing system and can assign an address to the new device using the initialization transaction. The computing system can keep a system list of the available devices and their respective addresses in a register.

When the computing system detects a bridge connected to a bus, it can determine that there is a second bus on the other side of the bridge, and can assign an identifier for the second bus (e.g., a bus number). The system list can be updated to include this second bus. The computing system can then probe the second bus for available devices and assign addresses to any identified devices using an initialization transaction, as described above. If another bridge is detected on the second bus, the computing system can repeat the above steps until no further bridges are detected. Once all available devices and bridges are identified, the computing system can compile a system list of all available devices and bridges, along with their respective addresses and identifiers. The computing system can send at least a portion of the system list to each bridge within the system. The portion of the system list that a bridge can receive can include a range of addresses for all devices behind the bridge that the bridge can use to identify and forward communications to devices behind it. Hence, in conventional computing systems, bridges become aware of device addresses after the computing system has identified all available devices and bridges and has assigned addresses to the available devices.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods, apparatuses and systems for snooping device initialization and configuration are described herein. Conventionally, in computing systems that use bridges to connect buses, a CPU is involved in an expensive process of mapping available devices and bridges, assigning addresses to the available devices, and creating a system list of available devices and bridges, along with their respective addresses and identifiers. This can be an intensive process, especially for computing systems with hundreds, thousands or more devices connected via multiple buses. Once the system list is complete, the CPU can send all or part of the complete list to the bridges. Hence, a bridge has to wait to receive the system list from the CPU before it can enable communication with devices behind it.

Implementations of the present disclosure expedite this process by using bridges to create lists of devices behind individual bridges in parallel with the CPU creating a complete system list of devices in the computing system. As a result, bridges no longer have to wait for receiving a complete system list of devices from the CPU and can enable communication with devices at an earlier time.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
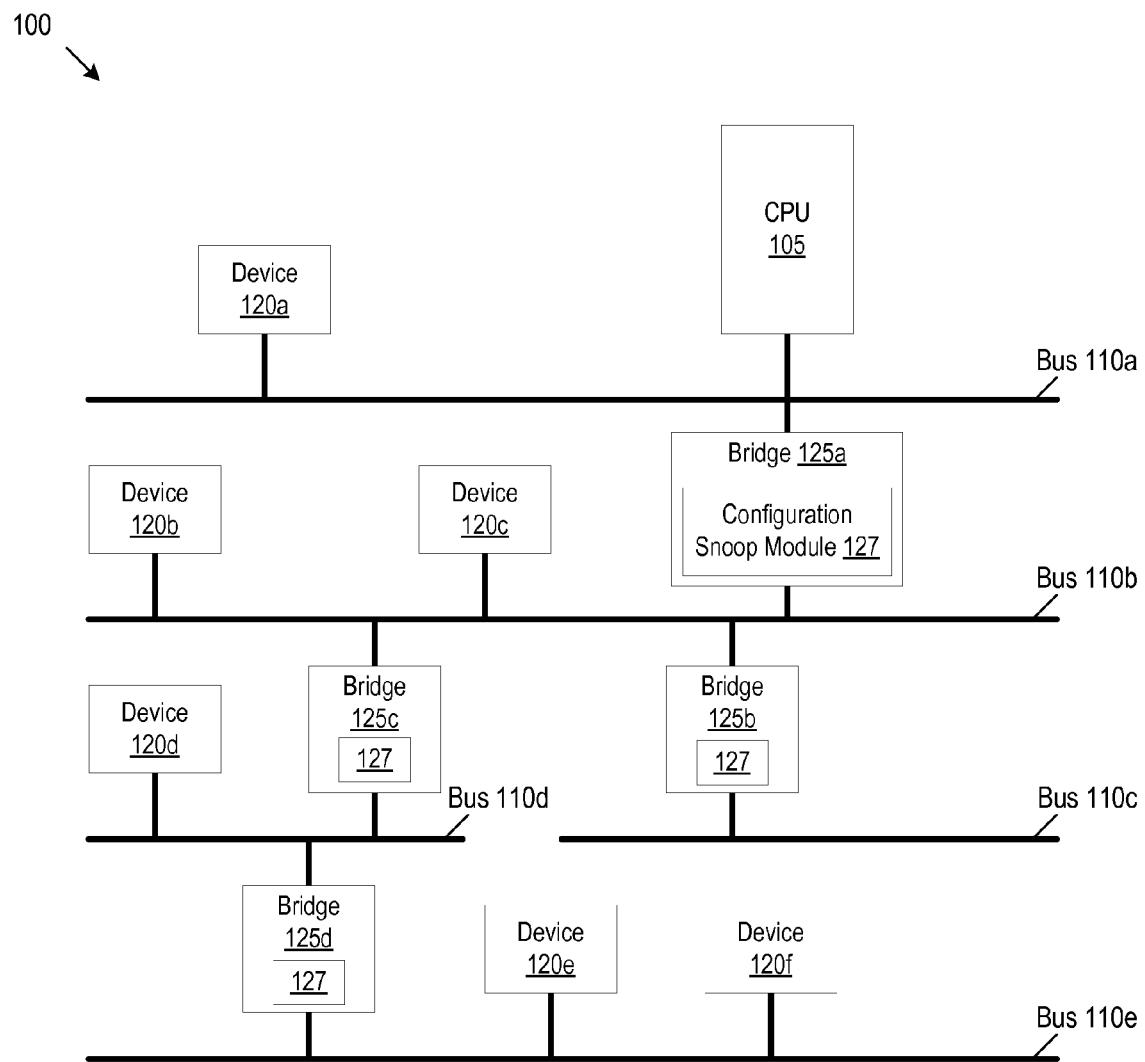
FIG. 1 is a block diagram that illustrates an example system architecture in which embodiments of the present disclosure may be implemented.

FIG. 1 illustrates sample computing system architecture 100 in which embodiments may operate. The computing system architecture 100 may be of a server, a workstation, a personal computer (PC), a virtual machine, a mobile device, tablet, laptop computer, thin client, etc. The computing system architecture 100 may include a processing device (e.g., CPU) 105, a plurality of buses 110*a-d*, one or more devices 120*a-f*, and one or more bridges 125*a-d*. Computing system architecture 100 may include more or fewer CPUs, buses, devices and bridges.

CPU 105 can refer to one or many processing devices and each CPU 105 can have one or more cores. CPU 105 can assign one or more identifiers (e.g., addresses, address ranges, device numbers, slot numbers, bus numbers, subordinate bus numbers) to buses 110, devices 120, and bridges 125 within a computing system. As the terms is used herein, address can be interpreted to include a plurality of addresses, an address range, a range of addresses, etc. CPU 105 can store assigned address and identifiers in a system list. CPU 105 can perform certain operations to communicate with devices 120. These operations can be part of transactions which can include, for example, an initialization transaction and a memory transaction. An initialization transaction can be used during system or device initialization (e.g., when a device is connected to the system after the system has been initialized and/or setup), and can include, for example, probing for available devices, assigning bus numbers, and allocating addresses to devices 120. A memory transaction can include an operation to access a device 120 and a response from the device 120. A Basic Input/Output System (BIOS), or an operating system for example, can use CPU 105 to perform the above operations and transactions.

Buses 110a-d can function as a connection or communication path between computer components and devices. Buses 110 can be identified by bus numbers that can be tracked in the system list. Bus 110a can be identified as "Bus 1", bus 110b can be identified as "Bus 2", etc. A bus can, for example, connect CPU 105 to memory. A bus that is directly connected to CPU 105 is typically referred to as a system or local bus. Other examples of buses include parallel and serial buses, both internal and external, such as a Peripheral Component Interconnect (PCI) bus, a Universal Serial Bus (USB), Hyper-Transport, Serial ATA, InfiniBand, etc. A bus 110 can have slots for connecting devices 120 to the bus 110.

Device 120 can communicate with other components (e.g., CPU 105, memory, other devices 120) via bus 110 and can be connected to slots on bus 110. Device 120 can be added to the computing system 100 at any time, including after the bridge is powered on and is in an active state (e.g., after the bridge has left the reset state). When a device 120 is connected to the computing system 100, it can receive an initialization message and send a response to the initialization message that includes a requested size of an address range for the device 120. Device 120 can be any hardware, or virtualized hardware, that can be connected to a computing system. Examples of devices include but are not limited to: video cards, controllers, sound cards, network interface cards, peripheral devices (e.g., keyboard, mouse, touch screen, remote control, camera), etc. Device 120 can be identified by an address, as described below. In an example, bus 110 is a PCI bus. Devices connected to a PCI bus appear to the CPU to be connected directly to the system bus, and are assigned addresses in the CPU's address space. Example devices that typically use PCI connections include: video cards, network cards, extra ports (e.g., USB), sound cards, TV tuners, disk controllers (e.g., RAID), etc.

Bridge 125 can function as a connection between buses 110. The bus 110 on the side of the bridge that is closer to the CPU 105 can be referred to as a primary or upstream bus, while the bus on the side of the bridge that is further from the CPU 105 can be referred to as a secondary or downstream bus. Bridge 125a, for example, connects bus 110a to bus 110b and functions as a communication path between the two buses. With respect to bridge 125a, bus 110a is the primary or upstream bus and bus 110b is the secondary or downstream bus. A bridge can allow operations or transactions to occur between an upstream bus and a downstream bus. Bridges can also increase the number of devices within a system because buses 110 typically support a finite number of connected devices 120. Examples of bridges include a PCI bridge, a PCI-to-PCI bridge, PCI Express (PCIe) bridge, etc. Bridges can be identified by a bridge number. Bridges can also be identified by the buses to which they are connected, which includes a primary bus, a secondary bus and a subordinate bus, which is the most remote bus of all the buses that can be reached downstream of the bridge. For example, bridge 125a can be identified by identifying primary bus 110a, secondary bus 110b and subordinate bus 110e.

When initializing a computing system, the CPU 105 can use an initialization probe to scan buses 110 for available devices 120 and bridges 125. The initialization probe can include a "HELLO" message to the detected device (e.g., device 120a). The device 120 can respond to the probe with a response that indicates it is available to receive an address. The response can also indicate an address range for the device. The response can indicate additional information relating to the address, such as an address range or size (e.g., number of bits) and the type of address it needs (e.g., I/O address, memory mapped I/O, or prefetchable memory address). The response can also include a device number for the device, a bus number for the bus that the device is connected to, and a bus slot number. For example, the device 120 response can indicate that it needs 0x100 bytes of PCI Memory address space. Using the response, CPU 105 can assign or allocate an address for the device 120a, which can be consecutive in view of other device addresses that are behind the same bridge. The address for device 120a can also be inconsecutive in view of other device addresses. In one implementation, the CPU 105 can group the type of access of the device (e.g., memory, I/O) with other accesses of the same type, and assign memory and I/O addresses to the detected devices. The CPU can identifying a first address of the address range for the device in a message, such as in an initialization message, in a response to the device response to the initialization message, etc.

CPU 105 can use initialization probes, and responses to the initialization probes to identify devices 120 and buses 110 within the system, to build a system list of the system and to program addresses for device 120. The CPU 105 can, for example, identify the number of available slots on a bus 110 and identify devices connected to the slots. The system list can be updated to identify whether a slot is occupied, and if occupied, the system list can include the corresponding device or bus. CPU 105 can also initiate a initialization transaction by assigning an address for device 120 to enable an address register in the device.

If CPU 105 detects a bridge 125 during initialization, it can add the bridge 125 to the system list. The CPU 105 can then scan the bus on the other side of the bridge 125. When scanning bus 110a, for example, CPU 105 detects bridge 125a. CPU 105 can identify bus 110a as the primary bus for bridge 125a and can identify bus 110b as the secondary bus for bridge 125a. CPU 105 can also assign a temporary subordinate bus identifier for bridge 125a (e.g., 0xFF). The subordinate bus identifier remains temporary until CPU 105 finishes identifying all the devices, buses and bridges within system 100. When another downstream bridge is discovered, the temporary subordinate bus identifier is updated to identify the newly discovered bridge. CPU 105 can continue to scan buses 110 for devices until no more bridges 125 are identified at which point the temporary subordinate bus identifier for each bus becomes permanent.

Continuing the above example, where CPU 105 identified bus 110a as the primary bus and bus 110b as the secondary bus, CPU 105 can also assign a temporary subordinate number, (e.g., 0xFF) for bridge 125a. CPU 105 can then scan bus 110b for available devices 120 and bridges 125. It detects device 120b and device 120c and assigns or allocates each device an address using the techniques described herein. It also identifies bridge 125b and 125c and their respective primary and secondary buses. Since there are no further bridges downstream of bridge 125b, the subordinate bus number of bridge 125b is known and corresponds with bus 110c. Bridge 125c is assigned a temporary subordinate bus number, (e.g., 0xFF). CPU 105 can then scan the bus 110d, the secondary bus of bridge 125*c*, identify device 120*d* and assign or allocate it an address, as described herein, and then scan bus 110*d*, the secondary bus of the detected bridge 125*d*. CPU 105 can assign or allocate addresses for device 120*e* and device 120*f*. Since there are no further bridges downstream of bridge 125*d*, the subordinate bus number of bridge 125*d* is known and corresponds with bus 110*e*. The temporary subordinate bus numbers of bridge 125*a* and bridge 125*c* are also updated to correspond with bus 110*e*, since it is the furthest downstream bus. The system is now initialized. Each bus, device and bridge is identified in the system list.

In some implementations, bridge 125 can include a configuration snoop module 127 that detects communications between buses 110, devices 120 and CPU 105 that are transmitted through bridge 125. These communications may include, for example, initialization probes, responses to initialization probes, and configuration messages. Configuration snoop module 127 can obtain information from the detected communications that can include the existence of a device at a slot on a bus 110, bus numbers, device numbers, addresses associated with devices 120*a-f*, address sizes and address types, bus identifiers and bridge identifiers. Based on the obtained communications, configuration snoop module 127 can create and maintain a list of devices behind the bridge 125*a*, including address ranges and address range sizes of these devices. Based on this list, bridge 125 can enable specific address ranges for devices downstream of the bridge 125. The list of devices can be stored in a bridge register, which may represent a portion of memory within the bridge or portion of virtual memory assigned to the bridge. The configuration snoop module 127 builds the list of devices behind the bridge concurrently with the CPU building a complete system list of devices and bridges in the computing system 100. When a bridge receives a communication intended for a device behind the bridge, it can use the range of addresses in the list of devices to claim the communication and forward it to the device behind the bridge. The configuration snoop module 127 can create and maintain the bridge register independent of any system register that the CPU 105 may create or maintain.

In some implementations, in addition to detecting communications between buses 110, devices 120 and CPU 105, a configuration snoop module 127 on one bridge can identify communications from other configuration snoop modules 127 on other bridges and add information obtained from the identified communications to the list of devices in the bridge register. Configuration snoop module 127 can also identify memory transactions to access devices within the system. A memory transaction can be a configuration transaction. The configuration transaction can include a Type 0 configuration transaction, for example, that is used to access a device on a primary bus or a Type 1 configuration transaction that is used to access a device that resides on a secondary bus behind a bridge.

The systems and methods described herein can be performed in a virtual computing environment. Computing system 100 can include one or more virtual machines (VMs) running on top of a hypervisor. A VM is a portion of software that, when executed on appropriate hardware, creates an environment allowing the virtualization of a physical computing system. The software layer providing the virtualization is commonly referred to as a hypervisor and is also known as a virtual machine monitor (VMM), a kernel-based hypervisor, or a host operating system. Virtualization permits multiplexing of an underlying host computer between different VMs. The host computer allocates a certain amount of its physical resources (e.g., components, devices) to each of the VMs. Each VM is then able to use the allocated resources to execute applications, including operating systems (referred to as guest operating systems (OS)). The hypervisor emulates the underlying hardware of the host computer, making the use of the VM transparent to the guest operating system and the user of the computer. A VM may have a virtual processor, virtual system memory, virtual storage, virtual buses, virtual bridges, and various virtual devices. A VM can be initialized in a similar manner as described herein and addresses for virtual devices can be assigned or allocated as described herein with respect to physical devices.

The hypervisor can execute commands using a virtual CPU (vCPU). When initializing devices of a virtual machine, addresses for each virtual device are allocated and recorded in a system register, as described herein. For virtual devices that are associated with underlying physical devices, the hypervisor can create a translation table that translates addresses of virtual devices available to the guest operating system to addresses for the physical devices on the host. If the hypervisor executes a memory access instruction for a physical device available to the guest OS, the hypervisor can use the translation table to translate the request for the virtual device to an address for the physical device.

In the virtual computing environment, bridge 125 may represent a virtual bridge that is part of the hypervisor. The virtual bridge can include a configuration snoop module. Similar to the description provided above, the configuration snoop module of the virtual bridge can obtain information from detected communications between a vCPU and other virtual devices of the VM, and can create and maintain a list of virtual devices behind the virtual bridge, as well as addresses, address ranges, sizes of address ranges, and enabled address registers for the virtual devices.

Figure 2:
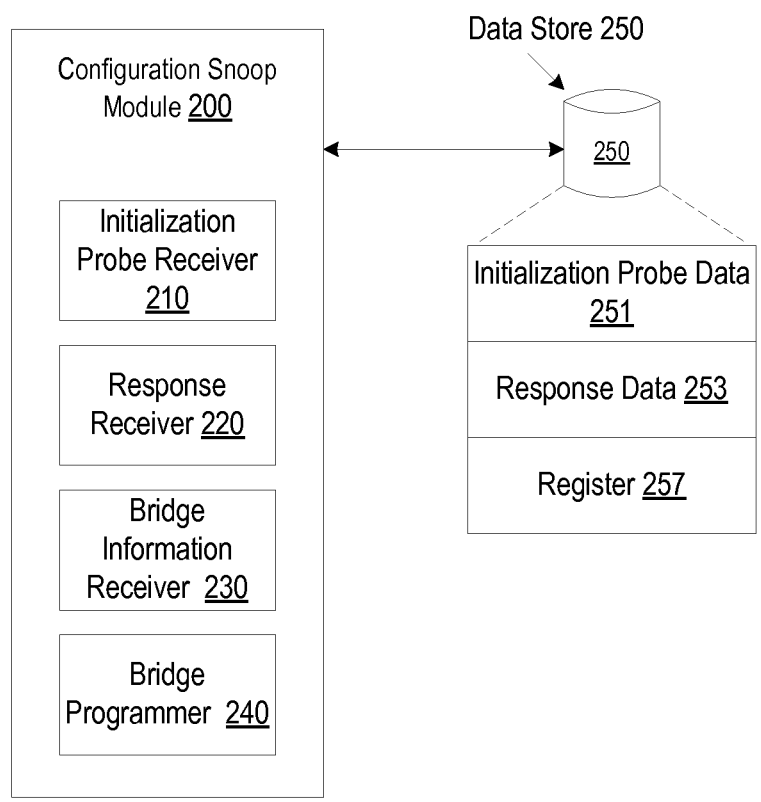
FIG. 2 is a block diagram illustrating one embodiment of a configuration snoop module.

FIG. 2 is a block diagram of one implementation of a configuration snoop module 200. The configuration snoop module 200 may be the same as configuration snoop module 127 in bridge 125 of FIG. 1. Configuration snoop module 200 can include an initialization probe receiver 210, a response receiver 220, a bridge information receiver 230, and a bridge programmer 240. Configuration snoop module 200 can be communicably connected to a data store 250. Configuration snoop module 200 may include more or fewer components.

Initialization probe receiver 210 can identify an initialization probe for a device that is downstream of a primary interface of a bridge. The initialization probe can be submitted by a CPU when initializing a computing system and can include a scan or probe for identifying available devices, buses and bridges within the computing system. The initialization probe can also be submitted by a CPU when assigning, allocating or programming an address for an available device. Initialization probe receiver 210 can store data pertaining to the identified initialization probe as initialization probe data 251 in data store 250. This data may include, for example, the existence of a device in a slot on a bus.

When an available device responds to an initialization probe, response receiver 220 can detect the response and obtain address information transmitted by the available device. The address information can indicate that the device is available to receive an address. The address information can also indicate an address range for the device. The address information can be a configuration header that allows a CPU to identify and control a device, such as device 120 of FIG. 1. Response receiver 220 can store the address information as response data 253 in data store 250. The response receiver 220 can also store an address assigned by the CPU for the device in data store 250 as part of response data 253.

Bridge information receiver 230 can receive a communication from a CPU, a device or from another bridge that includes information about one or more bridges, such as an identification of a primary bus of a bridge, a secondary bus of a bridge and a subordinate bus of a bridge, as described herein. Bridge information can be stored in a system list in bridge register 257 of data store 250.

Bridge programmer 240 can use data in the data store 250 to determine an address for a device in the system and to program the bridge with a list of devices behind the bridge. The list of devices can be stored in the bridge register 257. Bridge programmer 240 can also build a topology map of buses, bridges, and devices within a computing system and can store it in data store 250. Topology map can diagram the layout and architecture of a computing system. Topology map can identify an address, an address start location, a bus slot location, and the like. Topology map can also identify buses and bridges, as well as primary, secondary, and subordinate buses for a bridge. For devices that have base address registers, in one implementation bridge programmer 240 can program base address registers of devices behind the bridge.

Data store 250, which may be a file system, database or other data management layers resident on a data storage device such as a disk drive, RAM, ROM, database, etc. Data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. Data store 250 can store initialization probe data 251, response data 253, and bridge register 257.

Bridge register 257 can include information for identifying devices, buses and bridges within a computing system. A list of devices can be stored in bridge register 257. The list of devices can indicate configuration and address data for buses, bridges, and devices within the computing system (e.g., addresses, address ranges, device numbers, device vendor ID, deviceID, device class, slot numbers, bus numbers, subordinate bus numbers). The list of devices can also include a range of addresses for all devices behind the bridge. For example, if nine devices are behind a bridge, with consecutive addresses starting at 0 and ending at 8, the address range is 0-8. In one implementation, a bridge can use configuration snoop module 200 to program a base address register for a device.

Figure 3:
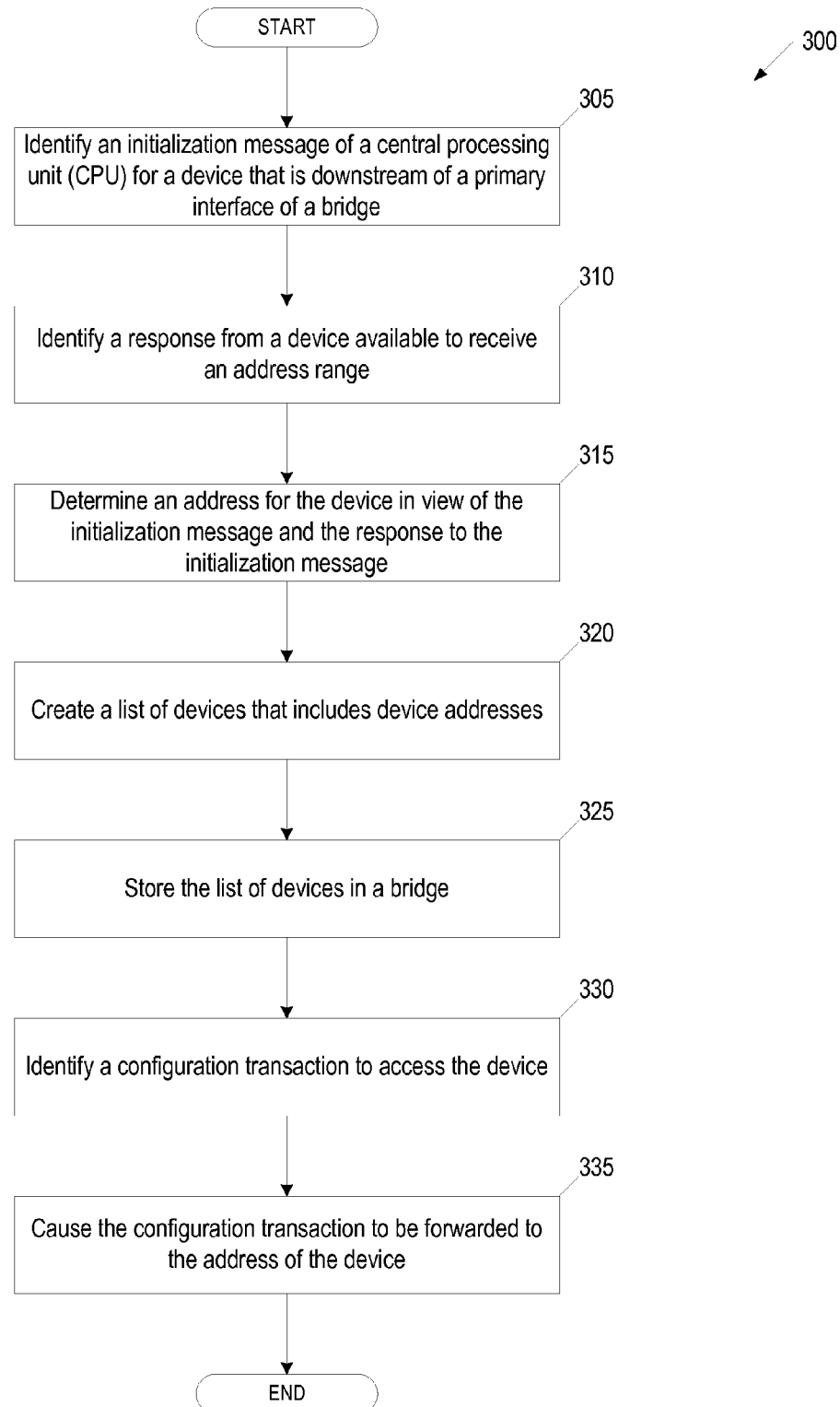
FIG. 3 is a flow diagram illustrating an embodiment of a method for snooping device configuration functions that can be performed by a bridge.

FIG. 3 is a flow diagram illustrating of one embodiment of a method 300 for snooping system configuration. Method 300 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one embodiment, method 300 is performed primarily by bridge 125 of FIG. 1.

Referring to FIG. 3, in one embodiment, method 300 begins at block 305, with processing logic identifying an initialization message of a CPU for a device that is downstream of a primary interface of a bridge. The initialization message can be for identifying available devices within a computing system, as described herein. A device can respond to the initialization probe and at block 310, processing logic can identify a device response to the initialization probe. The device response can include an indication of an address range for the device. At block 315, processing logic can determine an address for the device using communications received at block 305 or block 310. In one implementation, processing logic identifies additional communication between a CPU and a device, such as a message from a CPU allocating an address for a device at an address start location, or various transactions (e.g., memory transaction, initialization transaction), as described herein. Processing logic can use any identified transactions or data to determine the address for the device within the system. At block 320, processing logic can create a list of devices that includes device addresses. At block 325, processing logic can store the list of devices in a list in the bridge.

The following can describe example messages and operations the bridge can identify and use to determine addresses, address ranges, etc. for devices within a system:
  BIOS: write 0xfffff to register BAR0
  BIOS: read register BAR0
  Device: responds with 0xfff00
  BIOS: write 0xabcd00 to register BAR0
  BIOS: enable memory
By identifying the above, the bridge can determine that the device is assigned 0x100 bytes starting at 0xabcd00.

In one implementation, at block 330 processing logic identifies a memory transaction to access a device behind the bridge. At block 335, processing logic can cause the memory transaction to be forwarded to the address of the device. In one implementation, when the bridge receives a memory transaction to access a device with a particular address, at block 335 processing logic check its list of devices (e.g., address range) to see if it includes the address for the devices. If it does, then the processing logic can claim the transaction and can forward the transaction to a secondary bus behind the bridge, which then can forward the transaction to a device with a matching address. If there are multiple bridges connected to the secondary bus as described in conjunction with FIG. 1 and the device resides behind multiple downstream buses, then processing logic associated with each bridge can inspect an address associated with the transaction. If the address corresponds to a device that is in the list of devices in the bridge, then the bridge can claim the transaction and forward the transaction downstream. This process can repeat until the transaction reaches a bus with a device with a matching address.

Figure 4:
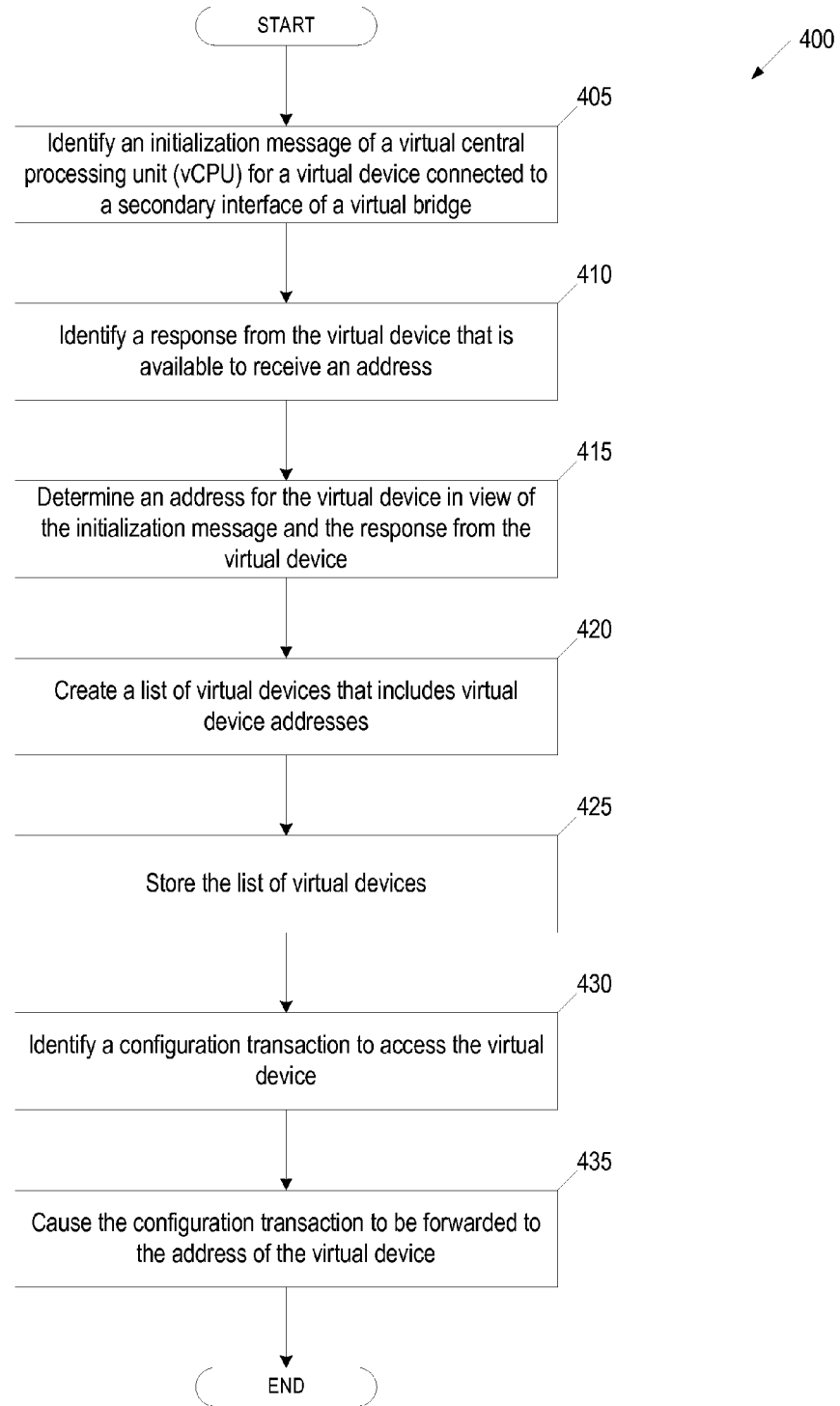
FIG. 4 is a flow diagram illustrating an embodiment of a method for snooping device configuration functions that can be performed by a virtual bridge.

FIG. 4 is a flow diagram illustrating of one embodiment of a method 400 for snooping system configuration in a virtual environment. Method 400 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In one embodiment, method 400 is performed primarily by virtual bridge, as described in conjunction with FIG. 1.

Referring to FIG. 4, in one embodiment, method 400 begins at block 405, with processing logic identifying an initialization message of a vCPU for a virtual device that is downstream of a primary interface of a virtual bridge. The initialization probe can be for identifying available virtual devices within a virtual computing system, as described herein. A virtual device can respond to the initialization probe and at block 410, processing logic can identify a virtual device response to the initialization probe. At block 415, processing logic can determine an address for the virtual device using communications received at block 405 or block 410. In one implementation, processing logic identifies additional communication between the vCPU and a virtual device, such as a message from a vCPU allocating an address at an address start location to the virtual device, or various transactions (e.g., memory transaction, initialization transaction), as described herein. Processing logic can use any identified transactions or data to determine the address for the virtual device within the system. At block 420, processing logic can create a list of virtual devices that includes virtual device addresses. At block 425, processing logic can store the list of virtual devices in a virtual register in the virtual bridge, or in memory allocated to the virtual bridge.

In one implementation, at block 430 processing logic identifies a memory transaction to access a virtual device behind the virtual bridge. At block 435, processing logic can cause the memory transaction to be forwarded to the address of the virtual device. In one implementation, when the virtual bridge receives a memory transaction to access a virtual device with a particular address, at block 435 processing logic check its list of virtual devices (e.g., address range) to see if it includes the address for the virtual devices. If it does, then the processing logic can claim the transaction and can forward the transaction to a secondary virtual bus behind the virtual bridge, which then can forward the transaction to a virtual device with a matching address. If there are multiple virtual bridges connected to the secondary virtual bus as described in conjunction with FIG. 1 and the virtual device resides behind multiple downstream virtual buses, then processing logic associated with each virtual bridge can inspect an address associated with the transaction. If the address corresponds to a virtual device that is in the list of virtual devices in the virtual bridge, then the virtual bridge can claim the transaction and forward the transaction downstream. This process can repeat until the transaction reaches a virtual bus with a virtual device with a matching address. For virtual devices that are associated with underlying physical devices, the physical devices on a host machine can have a different set of addresses. Processing logic can create a translation table that translates addresses of virtual devices available to the guest operating system to addresses for the physical devices on the host. If the processing logic executes a memory access instruction for a physical device available to the guest OS, processing logic can use the translation table to translate the request for the virtual device to an address for the physical device.

Figure 5:
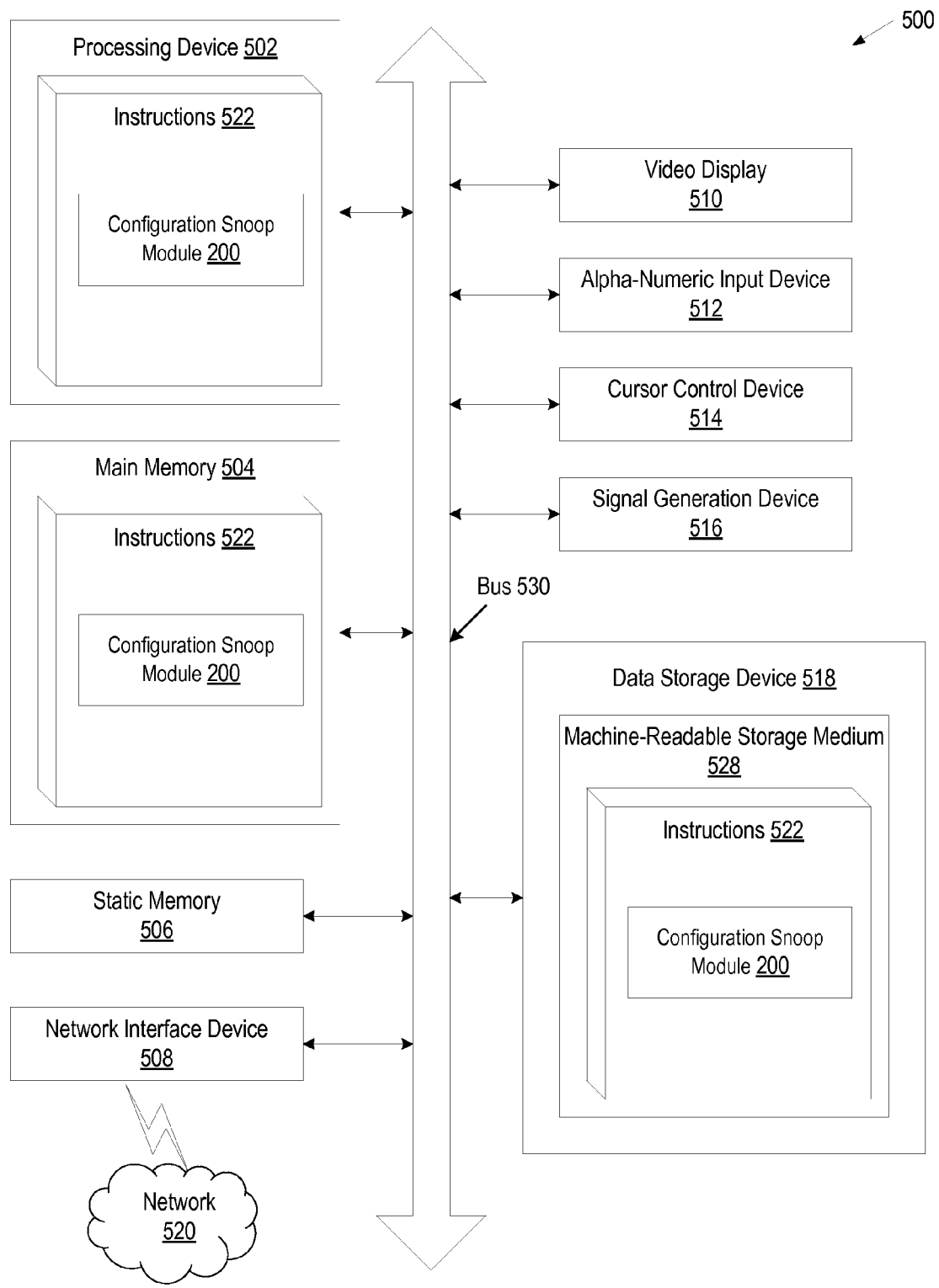
FIG. 5 illustrates a diagrammatic representation of a machine in an example form of a computing system within which a set of instructions, for causing the machine to perform any one or more of the methodologies discussed herein, may be executed.

FIG. 5 illustrates a diagrammatic representation of a machine in the exemplary form of a computing system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 can be configured to execute the configuration snoop module 127 for performing the operations and steps discussed herein.

Computing system 500 may further include a network interface device 508. Computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., configuration snoop module 127) embodying any one or more of the methodologies of functions described herein. The configuration snoop module 127 may also reside, completely or at least partially, within main memory 504 and/or within processing device 502 during execution thereof by computing system 500; main memory 504 and processing device 502 also constituting machine-readable storage media. The configuration snoop module 127 may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "causing", "instructing", "disabling", or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computing system bus.

The algorithms and displays presented herein are not inherently related to any particular computing system or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
   identifying, by a processing device of a bridge in a computing system, an initialization message of a central processing unit (CPU) for a device, the device being connected to a secondary interface of the bridge;
   identifying, by the processing device, a device response to the initialization message;
   determining, by the processing device, an address range for the device in view of the initialization message and the device response;
   storing the address range for the device in a list in the bridge; and
   enabling, by the processing device, access to the device in view of the list in the bridge before the bridge receives a system list from the CPU.

2. The method of claim 1 further comprising:
   identifying a memory transaction to access the device; and
   causing the memory transaction to be forwarded to the address of the device.

3. The method of claim 1, wherein the initialization message is from one of an operating system or a Basic Input/Output System (BIOS) of the computing system.

4. The method of claim 1, wherein the bridge connects a first Peripheral Component Interconnect (PCI) bus to a second PCI bus, wherein the device response comprises a request for a size of an address range for the device, the method further comprising:
   identifying a first address of the address range for the device from the initialization message.

5. The method of claim 1, wherein the device is a virtual device emulated by a hypervisor.

6. The method of claim 1, wherein the bridge is a virtual bridge emulated by a hypervisor.

7. The method of claim 1, wherein the device is a virtual device within a virtual machine running on a hypervisor in a virtual environment, the hypervisor having access to a physical device, the physical device having an address that corresponds to a host operating system, wherein determining, by the bridge, the address for the device in view of the device response comprises:
   creating a translation table that translates the address of the virtual device in a guest operating system to the address of the physical device on the host operating system.

8. The method of claim 1, wherein the list comprises address ranges for a plurality of devices, the method further comprising:
   identifying a memory transaction to access the device; and
   causing the memory transaction to be forwarded to an address of the device using the list.

9. An apparatus, comprising:
   a memory; and
   a processing device, operatively coupled with the memory, to:
      identify an initialization message for a device, the device being connected to a secondary interface of a bridge;
      identify a device response to the initialization message;
      determine an address range for the device in view of the initialization message and the device response;
      store the address range for the device in a list in the bridge; and
      enable access to the device in view of the list in the bridge before the bridge receives a system list from the CPU.

10. The apparatus of claim 9, the processing device further to:
    identify a memory transaction to access the device, and
    cause the memory transaction to be forwarded to the address of the device.

11. The apparatus of claim 9, wherein the bridge connects a first Peripheral Component Interconnect (PCI) bus to a second PCI bus, wherein the device response comprises a request for a size of an address range for the device, and wherein the processing device further to:
  identify a first address of the address range for the device from the initialization message.

12. The apparatus of claim 9, wherein the device is a virtual device emulated by a hypervisor, and the bridge is a virtual bridge emulated by the hypervisor.

13. The apparatus of claim 9, wherein the device is a virtual device within a virtual machine running on a hypervisor in a virtual environment, the hypervisor having access to a physical device, the physical device having an address that corresponds to a host operating system, wherein to determine the address for the device in view of the device response, the processing device is to:
  create a translation table that translates the address of the virtual device in the a operating system to the address of the physical device on the host operating system.

14. The apparatus of claim 9, wherein the list comprises address ranges for a plurality of devices, wherein the processing device further to:
  identify a memory transaction to access the device; and
  cause the memory transaction to be forwarded to an address of the device using the list.

15. A non-transitory computer readable storage medium including instructions that, when executed by a processing device of a bridge, cause the processing device to:
  identify an initialization message of a central processing unit (CPU) for a device, the device being connected to a secondary interface of the bridge;
  identify, by the processing device of the bridge, a device response to the initialization message;
  determine, by the processing device of the bridge, an address range for the device in view of the initialization message and the device response;
  store the address range for the device in a list in the bridge; and
  enable access to the device in view of the list in the bridge before the bridge receives a system list from the CPU.

16. The non-transitory computer readable storage medium of claim 15, the processing device further to:
  identify a memory transaction to access the device; and
  cause the memory transaction to be forwarded to the address of the device.

17. The non-transitory computer readable storage medium of claim 15, wherein the bridge connects a first Peripheral Component Interconnect (PCI) bus to a second PCI bus, wherein the device response comprises a request for a size of an address range for the device, the processing device further to:
  identify a first address of the address range for the device from the initialization message.

18. The non-transitory computer readable storage medium of claim 15, wherein the device is a virtual device emulated by a hypervisor, and the bridge is a virtual bridge emulated by the hypervisor.

19. The non-transitory computer readable storage medium of claim 15, wherein the device is a virtual device within a virtual machine running on a hypervisor in a virtual environment, the hypervisor having access to a physical device, the physical device having an address that corresponds to a host operating system, wherein to determine the address for the device in view of the device response, the processing device is to create a translation table that translates the address of the virtual device in a guest operating system to the address of the physical device on the host operating system.

20. The non-transitory computer readable storage medium of claim 15, wherein the list comprises address ranges for a plurality of devices, the processing device further to:
  identify a memory transaction to access the device; and
  cause the memory transaction to be forwarded to an address of the device using the list.

* * * * *